Patented May 20, 1947

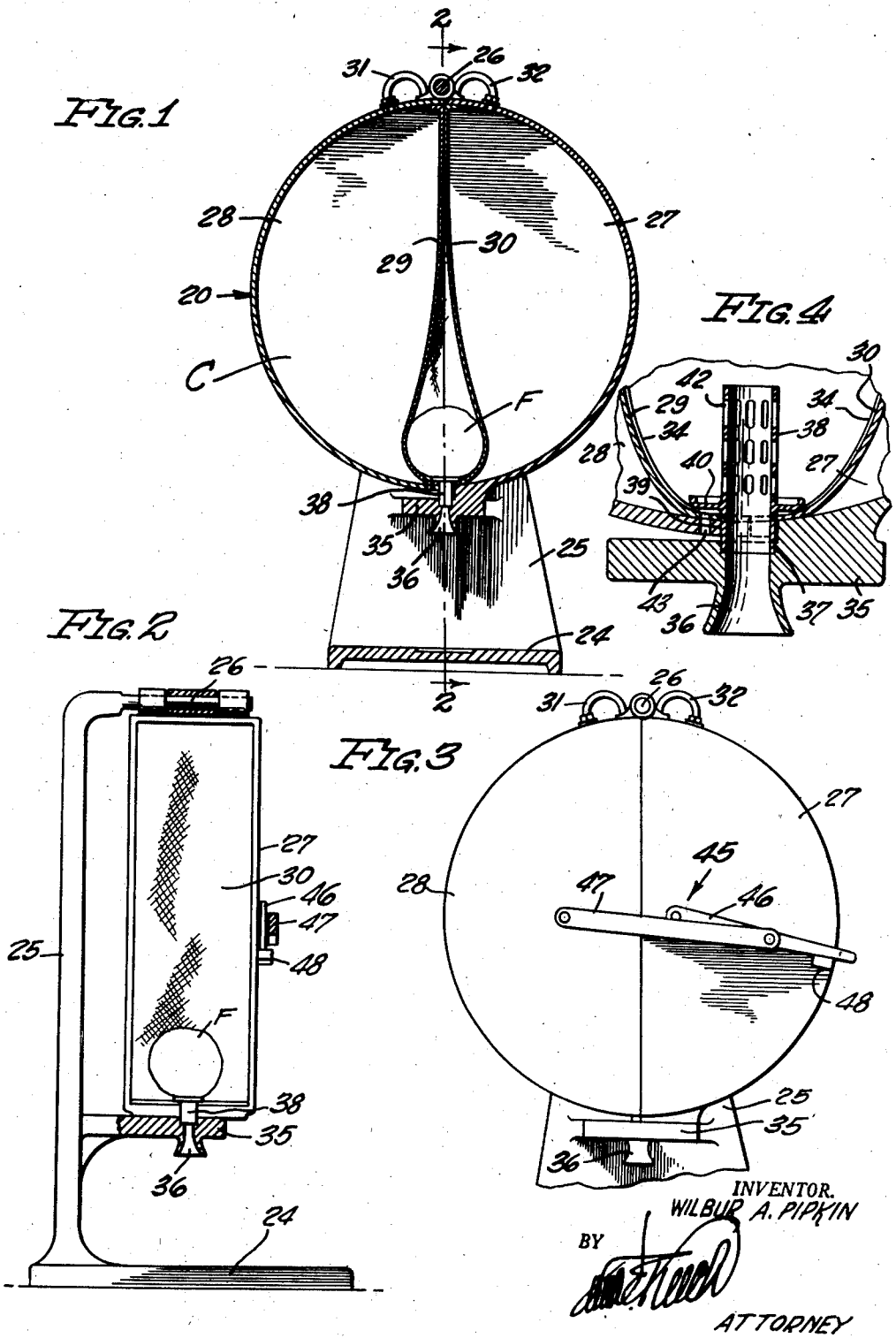

2,420,680

UNITED STATES PATENT OFFICE 2,420,680

PEEL OIL AND JUICE EXTRACTION BY FLUID PRESSURE

Wilbur A. Pipkin, Safety Harbor, Fla.

Application July 11, 1944, Serial No. 544,425

6 Claims. (Cl. 100—50)

This application is a continuation-in-part of my co-pending application Ser. No. 458,011, filed September 11, 1942, for improvements in Citrus fruit juice extraction, which latter application was a continuation of application Ser. No. 318,197, filed Feb. 9, 1940.

The invention relates to the extraction of peel oil and juice from whole citrus fruit and for illustrative purposes will be disclosed herein as when performed upon oranges.

The primary object of the invention is to press the peel oil and juice from whole citrus fruit so that these may be separately recovered.

It is another object of my invention to provide a method of and apparatus for extracting and separately recovering peel oil and juice from whole citrus fruit which operates on the fruit through the medium of fluid pressure.

The manner of accomplishing the foregoing objects as well as further objects and advantages will be made manifest in the following description taken in connection with the accompanying drawings in which:

Fig. 1 is a vertical section of a preferred embodiment of the apparatus of the invention.

Fig. 2 is a cross sectional view taken on the line 2—2 of Fig. 1.

Fig. 3 is an elevational view of said apparatus.

Fig. 4 is an enlarged fragmentary vertical sectional view, illustrating the device for forming the juice passage in the rind of the fruit.

Referring specifically to the drawings the apparatus 20 shown therein is seen to include a stand 24 having an upright post 25 which is turned forwardly at its upper end to provide a horizontal hinge 26.

Connected together by the hinge 26 is a pair of cooperating shells 27 and 28. Each of these is semi-circular when viewed from the front and abut against each other along a vertical diametral plane so that their edges form a fluid tight fit between said shells.

A chamber C is thus formed between these shells when they are close together, which is much larger than a piece of fruit F which the device is adapted to operate upon.

The open ends of the shells 27 and 28 are covered by flexible diaphragms 29 and 30 which may be of any suitable material such as a synthetic rubber which would be relatively immune to attack by citrus peel oil. These diaphragms constitute pressure applying members and are actuated by fluid admitted to said shells behind said diaphragms through flexible tubes 31 and 32. These tubes may be connected with any source supplying fluid under pressure.

As may be seen in Fig. 4, the inner surface of the diaphragms 29 and 30 are provided with corrugations or ribs 34 extending in an up and down direction, and forming channels for receiving peel oil and conducting this towards the bottom of the diaphragms.

Provided on the post 25 beneath the shells 27 and 28 is a horizontal table 35 with which the shell 27 may be formed integral as shown. The table 35 has a vertical hole 36 with a counterbore 37 at its upper end into which a juice passage forming tube or nozzle 38 is inserted downwardly.

This tube preferably opens axially upward and may have perforations in an upper portion thereof.

The bottom edges of the shells 27 and 28 are provided with semi-circular indents which come together around opposite sides of tube 38 as indicated at 39 in Fig. 4.

The tube 38 is provided with an annular flange 40 extending outwardly therefrom just above the adjacent bottom walls of shells 27 and 28, this flange preferably having an upturned outer edge as indicated in Fig. 4. A portion of the table 35 lies beneath an adjacent bottom portion of the shell 28 and an oil passage 43 extends through the shell 28 and the diaphragm 29 so as to drain any peel oil accumulating within the diaphragms 29 and 30 downwardly onto the table 35 from which this can be collected in a container placed beneath the edge of the table.

The shells 27 and 28 are adapted to be held open or in closed relation by linkage 45 as shown in Fig. 3. This may be on one or both sides of the shells but is herein illustrated as being provided only upon one side of these shells. This linkage 45 on one side of said shells comprises a lever link 46 which is pivoted to the shell 27 and a link 47 which in turn is pivoted to the lever link 46 and to the shell 28. Provided on the shell 27 is a stop 48 which is positioned to halt the lever link 46 in overthrown position so that the linkage 45 locks the shells 27 and 28 in closed relation.

Operation

In operating the apparatus 20 to perform the method of my invention on an orange, the lever 46 is first swung so as to open the two halves 27 and 28 of the compression chamber. An orange is now impaled upon the juice discharge tube 38 as shown in Figs. 1 and 2 and pressed against the flange 40 to make a snug seal therewith. The penetration of the rind of the orange by the tube 38 cuts a button from the rind which is forced into the tube 38 by the juice bearing structure into which the tube is also pressed. The halves of the compression chamber are then closed by rotating the linkage 45 into the position in which this is shown in Fig. 3.

Fluid under pressure is now introduced into the shells 27 and 28 through tubes 31 and 32. This fluid may be gaseous or hydraulic but it is at a relatively high pressure at its source.

As said fluid is first admitted into the shells 27 and 28 and while the pressure in these shells is still considerably below the pressure of said fluid at its source, the fluid presses the diaphragms 29 and 30 into close conformity with all portions of the exterior surface of the orange F excepting the area contacted by the flange 40 and within which the tube 38 has penetrated the orange.

It is to be noted that the diaphragms 29 and 30 enclose the flange 40 as well as the orange F so that, when pressure applied by fluid in the shells 27 and 28 to these diaphragms tends to reduce the size of the space occupied by the orange F, these press the flange 40 tightly against the rind of the orange F, the results of which will be made clear hereinafter.

As the pressure of the fluid in the apparatus 20 builds up to where there is practically no more free space between the diaphragms 29 and 30 and these are in substantially complete conformity with the orange F, a rapid rise in the pressure of this fluid will take place. This is due to the fact that the amount of work which has to be performed in introducing more fluid into the shells 27 and 28 greatly increases at this point because further enlargement of the fluid space in the apparatus may be effected only by reducing the space occupied therein by the fruit F.

Owing to the uniform application of fluid pressure to the exterior of the fruit F by conformity of the diaphragms 29 and 30 therewith, the rind of the fruit is adequately supported against any tendency the inner juice bearing structure might have to burst outwardly through the rind thereof. This effectively prevents bursting of the rind throughout the process.

The buildup of pressure in the shells 27 and 28 continues until this is sufficient to cause a constriction of the fruit F forcing the juice from the internal structure thereof outwardly through the tube 38.

The pressure of the diaphragms by which the fruit F is being thus constricted and its juice expressed downwardly through the tube 38, is applied over closely spaced linear areas by the ribs 34. A relatively high proportion of oil cells in the rind are thus engaged by these ribs and bursted. The peel oil flows therefrom and drains downwardly through the valleys between adjacent ribs 34 into the space between the lower ends of the diaphragms 29 and 30 from which this oil escapes through the oil passage 43 to be collected in a container separately from the juice discharged through the hole 36.

It being important to keep the peel oil from mingling with the juice and vice versa, a double seal between the orange F and the tube 38 is provided in the apparatus of my invention. One phase of this seal results from the fact that the lowermost perforations 42 in the tube 38 are disposed a substantial distance above the flange 40 so as to lie entirely within the orange F during the pressing operation. This of itself forms a seal between the tube 38 and the rind of the orange which prevents juice being expressed from the orange F other than through the tube 38 and passage 36.

The snug fit between the orange rind and the flange 40 produced by the latter being included within the enclosure containing the orange and surrounded by the diaphragms 29 and 30, as fluid pressure is applied through the latter to the orange, constitutes the second phase of the seal. This prevents such a flow of peel oil inwardly between the flange 40 and the rind of the fruit as might cause said peel oil to gain access to the interior of the tube 38 and thus mingle with the juice.

It is thus seen that with the consummation of the compression of the fruit between the diaphragms 29 and 30 a large portion of the juice in the orange F is extracted therefrom and the constriction of the rind of the fruit incidental to the juice extraction releases a large portion of the peel oil contained in the rind. The release of the peel oil and juice is thus effected in such a manner that they may be separately recovered with a minimum of mixture one with the other.

Following the completion of an extraction operation as above described, the two shells 27 and 28 are separated by manipulation of the linkage 45, the residue or carcass of the orange F which remains impaled upon the tube 38 is removed and the process repeated with a fresh orange.

The button cut from the rind by the tube 38 may remain attached to the carcass of the orange F by the tissue of the juice bearing structure or it may be discharged with the juice through the hole 36 to be eliminated from this in the usual step of centrifuging the juice from the solid matter therein which ordinarily follows the extraction of the juice.

I claim:

1. A method of extracting juice and peel oil from a whole citrus fruit which comprises: forming an opening in the rind of the fruit for the escape of juice therefrom, substantially surrounding said fruit with a fluid medium, applying compressive forces through said medium uniformly to closely spaced areas of the entire surface of said rind outside the area of said opening to squeeze the juice therefrom out of said opening and to press peel oil from the exterior surface of the rind, and separately collecting said juice and peel oil.

2. A method of extracting juice and peel oil from a whole citrus fruit which comprises: forming an opening in the rind of the fruit for the escape of juice therefrom, substantially surrounding said fruit with a fluid medium, applying compressive forces through said medium uniformly to closely spaced linear areas of the entire surface of said rind outside the area of said opening to squeeze the juice from said fruit out of said opening and to press peel oil from the exterior surface of the rind, and separately collecting said juice and peel oil.

3. In a device for extracting juice and peel oil from a whole citrus fruit the combination of: means for forming a hole in the rind of said fruit and supporting a portion of the surface of said fruit; flexible diaphragm means adapted to contact substantially all of the balance of the surface of said fruit; and fluid pressure means for forcing said diaphragm means against said fruit to constrict said fruit to force the juice therefrom outwardly through said opening and express peel oil from the rind of said fruit; and means for collecting said peel oil separately from said juice.

4. In combination: diaphragm means adapted to enclose a space containing a whole citrus fruit; hole forming means extending into said space and adapted to form a hole in the rind of said fruit and a passage connecting with said hole to conduct juice from said fruit when the latter is compressed by said diaphragm means; fluid pressure means for pressing said diaphragm means against said fruit thereby forcing juice from within said fruit outwardly through said passage and expressing peel oil from the oil cells in said rind; and means connecting with a lower portion of said space to afford an outlet for said peel oil whereby it may be collected separately from said juice.

5. A combination as in claim 4 in which the surfaces of said diaphragm means contacting said fruit are provided with parallel ribs.

6. In a device for extracting the juice from a whole citrus fruit, the combination of: a pair of flexible support means adapted for pressurally contacting opposite hemispheres of said fruit in close conformity with said hemispheres thereby adequately supporting the rind of said fruit against local outward bursting of the juice bearing structure of said fruit through said rind; a tube adapted to be inserted in the rind of said fruit to form a juice passage therein, said tube being open at its inner end to receive a button cut thereby from the rind; and means for applying said support means to said fruit hemispheres to support said rind as aforesaid and then while maintaining said support, further press said support means together to reduce the volume of the space occupied by said fruit and thus expel the juice therefrom through said tube, said support means operating as aforesaid against hemispheres of said fruit disposed on opposite sides of the axis of said tube.

WILBUR A. PIPKIN.

REFERENCES CITED

The following references are of record in the file of this patent:

UNITED STATES PATENTS

| Number | Name | Date |
| --- | --- | --- |
| 1,960,501 | Maull | May 29, 1934 |
| 1,922,773 | Maull | Aug. 15, 1933 |

FOREIGN PATENTS

| Number | Country | Date |
| --- | --- | --- |
| 768,115 | France | May 14, 1934 |
| 279,632 | Italy | Nov. 18, 1930 |